United States Patent [19]
Seibert et al.

[11] Patent Number: 4,761,042
[45] Date of Patent: Aug. 2, 1988

[54] ANTI-LOCK HYDRAULIC BRAKE SYSTEM

[75] Inventors: Wolfram Seibert, Pfungstadt; Norbert Ocvirk, Offenbach am Main; Lutz Weise, Mainz, all of Fed. Rep. of Germany

[73] Assignee: Alfred Teves GmbH, Frankfurt am Main, Fed. Rep. of Germany

[21] Appl. No.: 17,560

[22] Filed: Feb. 24, 1987

[30] Foreign Application Priority Data

Feb. 25, 1986 [DE] Fed. Rep. of Germany ....... 3605997

[51] Int. Cl.$^4$ .......................... B60T 8/88; B60T 8/44; B60T 8/36
[52] U.S. Cl. ...................... 303/92; 303/114; 303/119; 60/547.1
[58] Field of Search .................. 180/197; 188/181 A; 303/92, 100, 110, 111, 113, 114, 115, 116, 119, DIG. 3, DIG. 4; 60/547.1, 550, 563, 565, 589, 591

[56] References Cited

U.S. PATENT DOCUMENTS

| 4,363,524 | 12/1982 | Grunberg | 303/92 |
| 4,550,954 | 11/1985 | Leiber | 303/DIG. 4 |
| 4,555,144 | 11/1985 | Belart et al. | 303/92 |
| 4,629,258 | 12/1986 | Resch et al. | 303/92 |

FOREIGN PATENT DOCUMENTS

| 3404136 | 8/1985 | Fed. Rep. of Germany | 303/114 |
| 2160273 | 12/1985 | United Kingdom | 303/114 |

Primary Examiner—Andres Kashnikow
Assistant Examiner—Timothy Newholm
Attorney, Agent, or Firm—James B. Raden; Robert P. Seittler

[57] ABSTRACT

An anti-lock hydraulic brake system with a hydraulic brake power booster (3) and two static brake circuits (I, II) is provided. Connected to one brake circuit (I) are the two rear wheels (HR, HL), while to the other the two front wheels (VR, VL) are connected by way of multi-directional control valve (11 to 16) which sever for the braking pressure modulation and/or the slip control. In the event of slip control, controlled dynamic pressure out of an auxiliary-pressure supply system (4, 5) is introduced by way of the brake power booster (3) into the static brake circuits (I, II) through the intermediary of two hydraulically isolated circuits with main valves (31, 32) which are independent of each other. A positioning device (42) for limiting the pedal travel communicates hydraulically with the main valve (31) of the rear wheel brake circuit (I). The main valve (31) controlling the dynamic fluid flow into the rear wheel brake circuit is equipped with an additional pressure monitoring switch (35). In the event of a failure of the front wheel brake circuit (II), the slip control for the rear wheels (HR, HL) remains in operation.

9 Claims, 1 Drawing Sheet

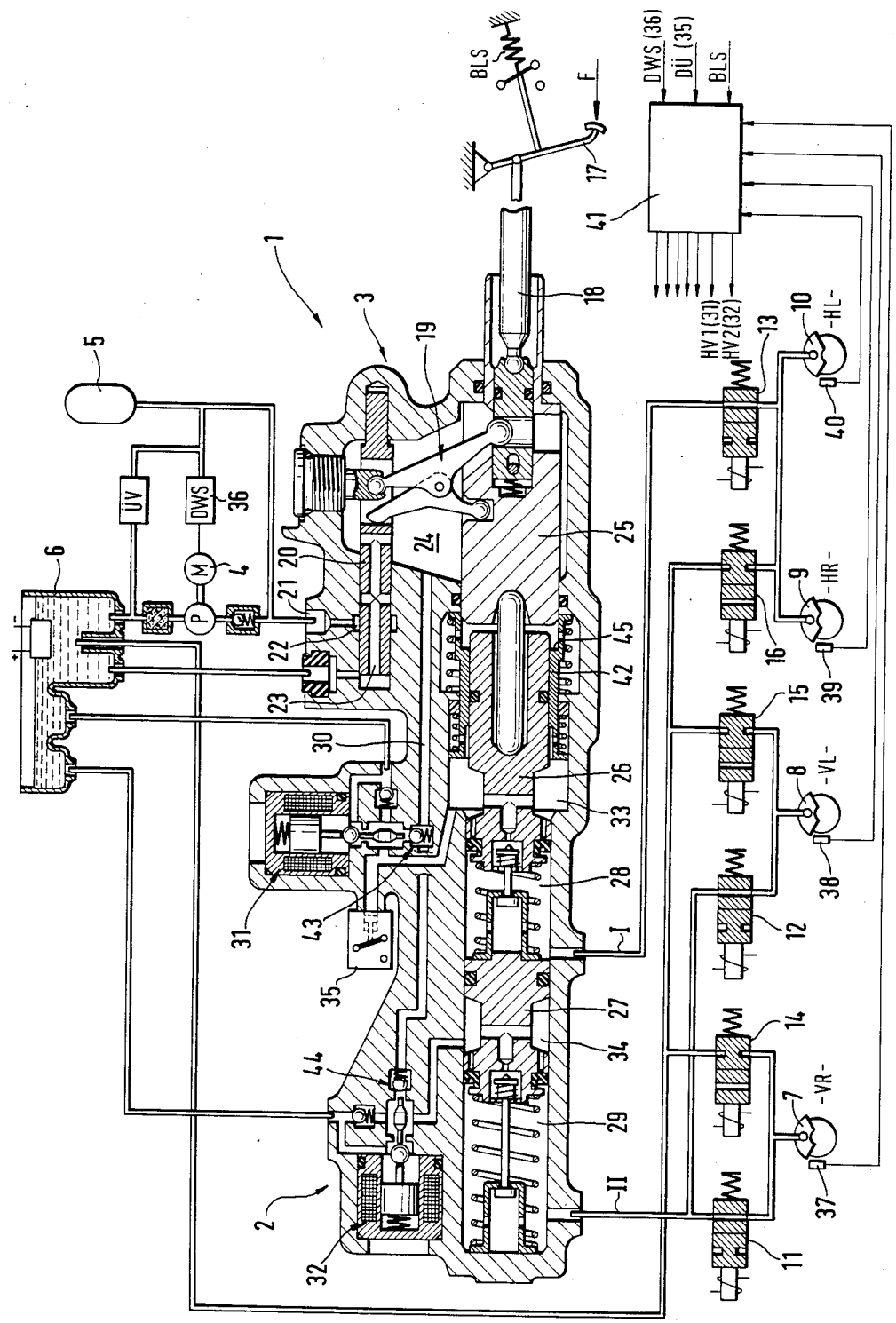

ANTI-LOCK HYDRAULIC BRAKE SYSTEM

The present invention relates to an anti-lock hydraulic brake system for motor vehicles, with a hydraulic brake power booster, with two hydraulically isolated static brake circuits and with an auxiliary-pressure supply system wherefrom, in the event of slip control, pressure fluid is dynamically introduceable into the static brake circuits by way of the brake power booster and by way of electromagnetically actuatable multi-directional control valves. Inlet and outlet valves are arranged in the pressure fluid paths leading from a brake pressure generator to the wheel brakes and/or from the wheel brakes to a pressure compensation reservoir. A positioning device is provided for limiting the pedal travel or returning the pedal in the event of a control action. Wheel sensors and electronic switching circuits are provided for the logical linkage and processing of sensor signals and for the generation of electric brake pressure control signals as a function of the rotational behavior of the wheel. Pressure-controlled switches and monitoring switching circuits are also provided.

Various types of brake systems of this kind are known. In the German printed and published patent applications No. 32 32 051 and 32 32 052, for example, brake systems with a pedal-actuated brake pressure generator consisting of a tandem master cylinder with a preceding hydraulic brake power booster are described. In a three-circuit design, one front wheel each is connected to the two static circuits of the tandem master cylinder, while the two rear wheels are jointly acted upon by the dynamic pressure of the brake power booster. In the pressure fluid paths leading from the brake pressure generator to the wheel brakes and/or from the wheel brakes to a pressure compensating reservoir, inlet and outlet valve pairs are provided for slip control. In addition, a main valve, namely a three-way/two-position valve is provided through the intermediary of which a controlled auxiliary pressure out of the brake power booster is introduced into the two static brake circuits of the master cylinder after the slip control has set in. This dynamic pressure also acts on a positioning device or positioning sleeve which is inserted in the power transmission path leading from the brake power booster to the master cylinder piston, and which limits the brake pedal travel or returns the brake pedal. Thereby it is ensured that a minimum volume is maintained in the master cylinder circuits, and it is guaranteed that even in the event of a failure of the auxiliary pressure a sufficient amount of pressure fluid is available for a normal (i.e., un-controlled) braking during each phase of the braking operation. The dynamic fluid inlet path of the pressure fluid leads from the pre-chamber connected directly to the main valve by way of non-return valves into the two working chambers of the tandem master cylinder.

A disadvantage of the direct connection of the rear wheels to the dynamic pressure in the brake power booster is that brake power can only be applied onto the front wheels, and, further, without boosting effect when a failure of the auxiliary-pressure supply system occurs. In addition, any defect in the auxiliary-pressure supply system or in the main valve has consequences on both static circuits.

It is, therefore, an object of this invention to overcome the aforementioned disadvantages and to design an anti-lock brake system of the present type such that in each case (i.e., even in the event of a defect in the supply system or in the dynamic fluid inlet path) the pedal force will be transmitted onto all vehicle wheels. It should also be possible, depending on the type of the defect, to deactivate and/or maintain the slip control in the individual brake circuits independently of each other.

SUMMARY OF THE INVENTION

This object is achieved in a simple and technologically advanced manner by an improvement of the brake system initially referred to wherein the front wheel brakes and the rear wheel brakes are, in each case, jointly connected to one of the two static brake circuits, wherein the pressure fluid out of the auxiliary-pressure supply system and/or out of the brake power booster is introduceable into one of the two static brake circuits respectively by way of hydraulically isolated circuits and multi-directional control valves, so-called main valves, or multi-directional control valve pairs. The valves are switchable independently of each other, and the positioning device is connected to the rear wheel brake circuit and/or to the multi-directional control valve controlling the dynamic flow into the static brake circuit of the rear wheel brakes.

Since, according to the invention, both the front and the rear wheels are connected to the static circuits of the master cylinder, the brake power is transmitted onto all wheels even without auxiliary pressure being available. Due to the use of two main valves which are switchable independently of each other, and due to the connection of the positioning device to the valve controlling the dynamic flow into the rear wheel brake circuit, it will be possible, for instance in the event of a defect in the front wheel brake circuit or in the associated valves, to initiate a partial deactivation during which the slip control for the rear wheels remains in operation. Thus, at the most, the braking effect of the front wheels or (because of the locked front wheels) the steerability gets lost, but not the driving stability of the vehicle.

According to a favorable embodiment of the present invention, the brake pressure generator comprises a tandem master cylinder with a preceding brake power booster, the master cylinder and brake power booster being designed and arranged such that in the event of a failure of the auxiliary pressure, the pedal force can be transmitted directly onto the master cylinder. Thus, a brake pressure generator generally similar to the one described in the aforementioned printed and published patent application is significantly improved in accordance with the present invention.

In the auxiliary-pressure supply system and at least at the outlet of the multi-directional control valve controlling the dynamic flow into the rear wheel brake circuit, pressure monitoring switches are expediently provided. By means of the signals of these switches, a partial deactivation or a complete cut off of the slip control (depending on the type of the defect) will be possible.

According to another embodiment of the present invention, switching means are provided which, in the event of a failure or a defect in the rear wheel brake circuit or in the auxiliary-pressure circuit controlling the dynamic flow, deactivate the slip control, and which maintain the slip control in the second brake circuit in the event of a defect in the front wheel brake circuit. The deactivation is achieved by blocking or switching back the associated main valve and/or outlet valves by way of which pressure fluid flows back into the compensating reservoir during the pressure reduction phase.

By means of the pressure monitoring switch at the outlet of the multi-directional control or main valve controlling the dynamic flow into the rear wheel brake circuit, the slip control can be deactivated in the event of a pressure failure or when the pressure is too low.

In another embodiment of the present invention switching means are provided which, in the event of one front or rear wheel becoming instable, switch on the dynamic flow into the two circuits. On the other hand, switching means can also be provided which, in the event of one rear wheel becoming instable, a dynamic flow is only initiated into the rear wheel brake circuit when, during this phase, the front wheels are not being controlled.

The multi-directional control or main valves are, expediently, shaped in the form of three-way/two-positioned valves which, in their inoperative position, hydraulically connect the associated pre-chamber or fluid inlet chamber in the master cylinder with the pressure compensating reservoir, and, after having been switched over, hydraulically connect said chamber with the controlled pressure of the brake power booster. Instead of the three-way/two-position valves, two two-way/two-position valves can also be used respectively.

According to the invention, it is also possible to provide switching means which, in the event of a failure of the rear wheel brake circuit or of the associated auxiliary-pressure circuit controlling the dynamic flow, maintain the slip control of the front wheels for a predetermined period of time and deactivate it thereafter. This period of time can also be predetermined by a specific, limited number of valve control pulses exciting the inlet and outlet valves.

BRIEF DESCRIPTION OF THE DRAWING

Further features, advantages and applications of the present invention will become apparent from the following description of an embodiment taken in connection with the single FIGURE of the accompanying drawing which schematically illustrates the components of a brake system according to the present invention.

DETAILED DESCRIPTION

The drawing illustrates a hydraulic brake system with two static brake circuits I, II. The system consists of a brake pressure generator 1 comprising a tandem master cylinder 2 with a hydraulic brake power booster 3 arranged upstream of the master cylinder 2. The master cylinder 2 and the brake power booster 3 are constructionally combined. The auxiliary-pressure supply system of the system comprises a hydraulic pump which is driven by means of an electric motor 4, and a pressure accumulator 5. The suction side of the hydraulic pump 4 and a plurality of chambers of the brake pressure generator 1 are connected with a pressure fluid storage and compensating reservoir 6.

Respectively connected to the two static circuits I and II are the two wheel brakes 7, 8, 9 and 10 of the front axle (II) and the rear axle (I) through the intermediary of valve pairs 11, 14; 12, 15; 13, 16. The valve pairs are electromagnetically actuatable two-way/two-position valves, the inlet valves 11, 12, 13 of which are in each case, switched to be open in the inoperative position, while the outlet valves 14, 15, 16 are switched to be blocked in the inoperative position. The brake pressure in the front wheel brakes 7, 8 is controllable individually by way of the two valve pairs 11, 14; 12, 15, whereas the brake pressure in the rear wheel brakes 9, 10 is constant due to the common valve pair 13, 16.

The pedal force symbolized by arrow F is transmitted from a brake pedal 17 by way of a push rod 18 to the brake power booster 3. On actuating the pedal 17, the piston 20 of a sliding valve is moved through the intermediary of a double lever 19, so that a pressure out of the auxiliary-pressure supply system (4, 5), which pressure is proportional to the pedal force F, is introduced into a booster chamber 24 by way of a connection 21, by way of an annular chamber 22 and by way of bores 23 inside the piston 20. The pressure also acts by way of a booster piston 25 onto the two pistons 26, 27 inside the master cylinder 2. In the working chambers 28 and 29, and thus in the static circuits I, II, a boosted brake pressure which is proportional to the pedal force F is built up in a known manner, and is further transmitted to the wheel brakes 7, 8, 9, 10 by way of the inlet valves 11, 12, 13.

In addition, the booster chamber 24 of the brake power booster 3 is connected by way of a pressure fluid channel 30 with two three-way/two-positioned valves 31, 32, the so-called main valves. The valves are electromagnetically actuatable valves connecting in the depicted inoperative position the annular chambers or fluid inlet chambers 34 on the pedal side of the master cylinder working pistons 26, 27 with the pressure compensating reservoir 6. The pressure fluid path from the channel 30 by way of the valves 31, 32 to the fluid inlet chambers 33, 34 is closed in the inoperative position. This path is only released after the main valves 31, 32 are switched over, and the pressure fluid connection of the valves 31, 32 to the pressure compensating reservoir 6 is closed simultaneously or immediately preceding the switching. The function of the main valves 31, 32 could also be respectively accomplished by two simultaneously switched two-way/two-position valves, one of which would be closed and the other would be switched so as to be open in the inoperative position.

The main valve 31 is equipped with a pressure monitoring switch 35 which communicates hydraulically with the fluid inlet chamber 33 and which signals the presence of pressure and/or a pressure failure in chamber 33. A second, pressure-sensitive switch, namely the pressure control and pressure warning switch 36, serves to control the hydraulic pump 4 as a function of the pressure in the pressure accumulator 5 and to indicate a possible pressure failure.

The rotational behavior of the wheels VR, VL, HR, HL is sensed by means of wheel sensors 37 to 40 supplying corresponding information in the form of electric signals to a control unit 41 whose electronic switching circuits link and evaluate the signals, and generate electric signals for the control of the inlet and outlet valves 11 to 16 and the main valves 31 and 32.

The outlet signals of the pressure monitoring switch 35 and the pressure-sensitive switch 36 are also fed into the control unit 41, because these signals also influence the actuation of the inlet and outlet valves and the main valves 32, 32.

Finally, the piston 26, which is acted upon by the booster piston 25, also carries a positioning device 42 in the form of a sleeve which exerts a force onto the booster piston 25 when pressure is introduced into the fluid inlet chamber 33. This force acts in opposition to the direction of the pedal force F applied onto the pedal 17 during braking, and which thus confines the pedal travel or returns the pedal 17.

The illustrated embodiment of the brake system according to the present invention operates as follows: As long as none of the wheels shows instability and/or a wheel-lock tendency during a braking operation, both the inlet and outlet valves 11 to 16 and the two main valves 31 to 32 remain in their inoperative position. The inlet valves 11 to 13 are thus switched so as to be open, while the outlet valves 14 to 16 are closed. The fluid inlet chambers 33 and 34 in the master cylinder 2 are connected with the compensating reservoir 6 by way of the main valves 31 and 32. Thus, atmospheric pressure prevails in the fluid inlet chambers 33 and 34. In the channel 30 connected to the booster chamber 24, the controlled pressure prevails but which only reaches the inlet opening of the multi-directional control valves 31 to 32. The inlet opening is blocked by the non-return valves 43, 44.

When the system operates correctly, the brake pressure generated by means of the brake pedal 17 is hydraulically boosted and then transmitted to the master cylinder 2 and to the front wheel and rear wheel brakes 7 to 10. On the failure of auxiliary energy, for example, due to a defective pump, a jamming of the booster valve (piston 20) or a breakage of the double lever 19, only the boosting effect will fail, but brake pressure is still effective upon all wheel brakes 7 to 10 when increasing the brake force.

If a wheel-lock tendency occurs on one or both front wheels due to a panic braking, a slippery road surface or similar condition, the slip and/or anti-lock control action commences. Electric energy for energizing and switching over the main valves 31, 32 is provided by way of the outlets HV1 and HV2 of the control unit 41. By means of this, the two fluid inlet chambers 33, 34 are separated from the reservoir 6 and are connected instead to the controlled pressure in the booster chamber 24 by way of the channel 30. Controlled pressure can then flow dynamically by way of this path into the chambers 33, 34 and from there by way of non-return valves in the cup of the pistons 26, 27 into the working chambers 28, 29 and/or into the static brake circuits I, II of the brake system. In addition, the pressure flow into the chamber 33 acts upon the return sleeve of the positioning device 42, and thereby returns the pedal 17 or limits the pedal travel. that is, the booster piston 25 can only be displaced in the direction of pedal actuation up to a stop 45 at the inside of the return sleeve 42. The pressure fluid flowing back to the reservoir 6 by way of the outlet valves 14 to 16 during the pressure control action (i.e., during the pressure reduction phase) will be supplied into the static circuits by way of the described fluid inlet path. Thus, an empty condition of the working chambers 28, 29 is prevented.

If a rear wheel is the first to be controlled, which indicates a defect, e.g. a failure of the front wheel brake circuit II, only the multi-directional and/or main valve 31 associated with the rear wheel brake circuit I will be energized. In this regard, brake systems are, in principle, designed such that the larger brake force portion is produced by the front wheels so that without control the rear wheels can only become unstable after the front wheels have been blocked. After the multi-directional and/or main valve 31 is energized, the positioning device 42 will start to operate. The pressure fluid will only flow dynamically into the rear wheel brake circuit I. A slip-controlled deceleration of the rear wheels will then take place.

Alternatively, the control unit can be designed such that in the above-mentioned failure case, at first both main valves 31, 32 will be switched over, and that on detection of the pressure drop (due to a leakage in the front wheel brake circuit II), the main valve 32 will again be switched back into the inoperative position. In this situation, the pressure drop is signalled by means of the pressure warning switch 36. With this design a slip-controlled deceleration of the rear wheels is also achieved. If the pressure switch 35 associated with the rear wheel circuit I signals a pressure drop, which is, for example, caused by a jamming of the main valve 31, the slip control of the brake system according to the invention will be deactivated.

In an alternative design of the control unit, the control action will only be cut off by a signal of the pressure monitoring switch 35, which signal indicates the pressure failure, after a certain period of time or after a specific number of pressure build-up pulses in the front wheel brake circuit II. The main valve 31 associated with the rear wheel brake circuit I will remain closed in this situation, or will be switched back into the depicted inoperative position.

The stop light switch BLS signals the control unit 41 as to whether the instability of a wheel recognized from the rotational behavior of the wheel really occurs during a braking operation or whether this instability is due to another cause such as aquaplaning. In the latter case, a response of the valves 11 to 16, 31, 32 is not desired.

By means of the present invention, a slip-controlled brake system requiring relatively low design expenditure (that is, for example, only a single positioning device) can thus be realized.

The system provides a controlled deceleration, even on the occurrence of defects. Due to the control of the rear wheels, which is maintained in the event of a failure of the front wheel brake circuit, the vehicle steering stability which would be lost in the event of locking rear wheels is also retained in these situations. In the event of a failure of the rear wheel circuit, a locking of the front wheels is permitted because it is not critical with regard to the driving stability. In this failure case, only the steerability of the vehicle is compromised.

What is claimed is:

1. An anti-lock hydraulic brake system for motor vehicles having vehicle wheels with wheel brakes with a pedal-actuated hydraulic brake power booster (3) having a booster chamber, with each of two hydraulically isolated static brake circuits connected to a separate working chamber of a tandem master cylinder, with each of two fluid inlet chambers of said master cylinder connected to one of said working chambers via a valve means, and with an auxiliary-pressure supply system (4, 5), wherein in the event of slip control pressure fluid is dynamically introducible into the static brake circuits by way of the booster chamber of the brake power booster, electromagnetically actuatable multi-directional control valves, said fluid inlet chambers, said valve means, and said working chambers, with inlet and outlet valves arranged in the pressure fluid paths leading from the wheel brakes to a brake pressure generator (1) and a pressure compensating reservoir, with a positioning device connected to the pedal for limiting the pedal travel and returning the pedal in the event of a control action and with wheel sensors and electronic switching circuits for the logical linkage and processing of sensor signals and for the generation of electric brake pressure control signals as a function of the rotational behavior of at least one wheel, and including pressure-controlled switches and monitoring switching circuits, wherein the front wheel brakes (7, 8) and the rear wheel brakes (9, 10) are respectively connected to one of the two static brake circuits (I, II), wherein the pressure fluid out of said auxiliary-pressure supply system (4, 5) and said brake power booster (3) is delivered into the two static brake circuits (I, II) from said booster chamber of said brake power booster (3) respectively by way of hydraulically isolated circuits having said multi-directional control valves (31, 32) respectively inserted therein which are switchable independently of each other, wherein the multi-directional control valves, in their inoperative positions, each connect the associated fluid inlet chamber with a pressure compensating reservoir, and, after having been switched over, hydraulically connect said fluid inlet chamber with the booster chamber, and wherein the positioning device (42) is connected to the rear wheel brake circuit (I) and is responsive to the multi-directional control valve (31) controlling the dynamic flow into the static brake circuit of the rear wheel brakes to translate said pedal toward its returned position.

2. The brake system according to claim 1, wherein said brake pressure generator (1) comprises a tandem master cylinder (2) with a preceding brake power booster (3), said master cylinder (2) and said brake power booster (3) being interconnected with said brake pedal so that in the event of a failure of the auxiliary pressure, the pedal force (F) can be transmitted directly onto the master cylinder (2).

3. The brake system according to claim 2, wherein pressure monitoring switches (35, 36) are provided in the auxiliary-pressure supply system (4, 5) and at the outlet of the multi-directional control valve (31) controlling the dynamic flow into the rear wheel brake circuit.

4. The brake system according to claim 3, wherein switching means are provided which, in the event of a failure of at least one of the rear wheel brake circuit (I) and a defect in the rear wheel brake circuit and in the auxiliary-pressure circuit controlling the dynamic flow into the rear wheel brake circuit (I), deactivate the slip control and which, in the event of a failure of at least one of the front wheel brake circuit (II) and the auxiliary-pressure circuit controlling the dynamic flow into said front wheel brake circuit, maintain the slip control in the rear wheel brake circuit (I).

5. The brake system according to claim 4, wherein said pressure monitoring switch (35) at said outlet of the multi-directional control valve (31) controlling the dynamic flow into the rear wheel brake circuit (I) deactivates the slip control in the event of a pressure failure.

6. The brake system according to claim 5, wherein the multi-directional control valves (31, 32) are three-way/two-position valves.

7. The brake system according to claim 1, wherein switching means are provided which, in the event of one front or rear wheel (VR, VL, HR, HL) becoming instable, initiate the dynamic flow into the two circuits (I, II).

8. The brake system according to claim 1, wherein switching means are provided which, in the event of one rear wheel (HR, HL) becoming instable and the front wheels remaining, at the same time, stable, a dynamic flow is only initiated into the rear wheel brake circuit (I).

9. The brake system according to claim 8, wherein switching means are provided which, in the event of a failure of the rear wheel brake circuit (I) or of the associated auxiliary-pressure circuit controlling the dynamic flow, maintain the slip control for the front wheels (VR, VL) for a predetermined period of time and deactivate it thereafter.

* * * * *